(12) United States Patent
Cellier

(10) Patent No.: US 10,138,897 B2
(45) Date of Patent: Nov. 27, 2018

(54) BLADE AND BLADE DIHEDRAL ANGLE

(71) Applicant: Snecma, Paris (FR)

(72) Inventor: Damien Cellier, Paris (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 188 days.

(21) Appl. No.: 14/778,317

(22) PCT Filed: Mar. 18, 2014

(86) PCT No.: PCT/FR2014/050623
§ 371 (c)(1),
(2) Date: Sep. 18, 2015

(87) PCT Pub. No.: WO2014/147332
PCT Pub. Date: Sep. 25, 2014

(65) Prior Publication Data
US 2016/0061218 A1 Mar. 3, 2016

(30) Foreign Application Priority Data
Mar. 20, 2013 (FR) ...................................... 13 52495

(51) Int. Cl.
*F04D 29/38* (2006.01)
*F01D 5/14* (2006.01)
(Continued)

(52) U.S. Cl.
CPC ............ *F04D 29/384* (2013.01); *F01D 5/141* (2013.01); *F04D 29/324* (2013.01);
(Continued)

(58) Field of Classification Search
CPC .... F04D 29/384; F04D 29/324; F04D 29/544; F04D 29/563; F04D 29/386; F01D 5/141;
(Continued)

(56) References Cited

U.S. PATENT DOCUMENTS

| 1,829,179 A | * | 10/1931 | Back | .................... B23P 15/04 29/889.72 |
| 2,752,258 A | * | 6/1956 | Swentzel | .............. C04B 35/565 501/92 |

(Continued)

FOREIGN PATENT DOCUMENTS

| EP | 1 505 302 A1 | 2/2005 |
| EP | 1 930 600 A2 | 6/2008 |

(Continued)

OTHER PUBLICATIONS

Leroy H. Smith, Jr. et al., "Sweep and Dihedral Effects in Axial-Flow Turbomachinery" Journal of Basic Engineering, Sep. 1963.
(Continued)

*Primary Examiner* — Logan M Kraft
*Assistant Examiner* — Brian Christopher Delrue
(74) *Attorney, Agent, or Firm* — Pearne & Gordon LLP

(57) ABSTRACT

The invention relates to a compressor blade, defined at each one of the points of its surface by a sweep angle and a dihedral angle, comprising: a root, a tip, the distance between the root and the tip, measured along an axis referred to as the radial axis, perpendicular to an axis of rotation of the compressor, being referred to as radial height (h), a zone, between the root and the tip, of which a first portion has a strictly positive leading edge dihedral angle, and a second portion has a strictly negative leading edge dihedral angle, the zone of maximum dihedral angle being, along the radial axis, between r=0.25 h and r=0.7 h.

7 Claims, 6 Drawing Sheets

(51) Int. Cl.
*F04D 29/32* (2006.01)
*F04D 29/54* (2006.01)
*F04D 29/56* (2006.01)

(52) U.S. Cl.
CPC ......... *F04D 29/544* (2013.01); *F04D 29/563* (2013.01); *F05D 2250/71* (2013.01); *Y02T 50/673* (2013.01)

(58) Field of Classification Search
CPC . F05D 2250/71; F05D 2250/74; Y02T 50/673
USPC ..................................................... 416/223 A
See application file for complete search history.

(56) References Cited

U.S. PATENT DOCUMENTS

| | | | | |
|---|---|---|---|---|
| 3,127,093 | A * | 3/1964 | Sudrow | B64C 11/001 244/23 C |
| 5,167,489 | A | 12/1992 | Wadia | |
| 5,249,922 | A * | 10/1993 | Sato | F01D 5/142 415/191 |
| 6,071,077 | A * | 6/2000 | Rowlands | F01D 5/141 416/223 A |
| 8,684,698 | B2 * | 4/2014 | Breeze-Stringfellow | F01D 5/141 416/223 A |
| 8,702,398 | B2 * | 4/2014 | Breeze-Stringfellow | F01D 5/141 416/242 |
| 9,074,483 | B2 * | 7/2015 | Breeze-Stringfellow | F01D 5/141 |
| 2008/0131271 | A1 * | 6/2008 | Wood | F01D 5/141 415/191 |
| 2008/0131272 | A1 * | 6/2008 | Wood | F01D 5/142 415/199.5 |
| 2010/0054946 | A1 * | 3/2010 | Orosa | F04D 29/324 416/223 R |
| 2012/0243975 | A1 | 9/2012 | Breeze-Stringfellow | |
| 2012/0243983 | A1 | 9/2012 | Breeze-Stringfellow | |
| 2012/0244005 | A1 * | 9/2012 | Breeze-Stringfellow | F01D 5/141 416/223 A |
| 2013/0266451 | A1 * | 10/2013 | Pesteil | F01D 5/141 416/223 R |
| 2014/0133989 | A1 | 5/2014 | Belmonte | |
| 2014/0248144 | A1 | 9/2014 | Cellier | |
| 2014/0248155 | A1 | 9/2014 | Merville | |

FOREIGN PATENT DOCUMENTS

| | | |
|---|---|---|
| FR | 2 976 968 A1 | 12/2012 |
| FR | 2 981 118 A1 | 4/2013 |

OTHER PUBLICATIONS

Search Report issued in French Patent Application No. FR 13 52495 dated Sep. 18, 2013.
International Search Report issued in Application No. PCT/FR2014/050623 dated May 23, 2014.
Written Opinion issued in Application No. PCT/FR2014/050623 dated May 23, 2014.

* cited by examiner

BLADE AND BLADE DIHEDRAL ANGLE

TECHNICAL FIELD AND PRIOR ART

The invention relates to the structure of a blade (or of a vane) of a compressor of a turbomachine, of the type that can be used in an aircraft engine.

Such a compressor comprises a succession of stages arranged in series. Each stage comprises a mobile impeller (rotor), or mobile blading, and a blade stator (rectifier).

Each mobile blading itself comprises a circular disc whereon are fixed blades (or fins) and rotate in front of a portion of the stator. It makes it possible to suck and to accelerate the flow of air by deviating it with respect to the shaft of the engine. The rectifier that follows it rectifies the flow in the axis and slows it down by transforming a portion of its speed into pressure.

FIG. 1 diagrammatically shows a cross-section that shows a portion of such a compressor. In this figure, the mobile blades 10 and the blades 20 of the rectifiers are identified. The latter are integral with ferrules 22, 26. The reference 27 designates a flange for fastening the whole to a compressor casing.

Each mobile blade 10 is positioned on an internal platform 13 which is extended by a root 18, which is itself engaged in a housing of a rotor 25. Note that these parts can also be produced as a single block, this set is called an integrally-bladed disc.

The rotation of the rotor is carried out about an axis AA'.

In order to design the blades 10, 20 of such a HP (high pressure) compressor, studies are carried out, for the purpose of improving the aerodynamic performance of the blading, while still providing a certain mechanical strength.

Interest is in particular given to the stacking of cuts. The tangential stacking law corresponds to the position of the centre of gravity of each section of the blade according to a plane perpendicular to the main radial direction of the blade, with respect to a main radial axis of the blade.

The stacking of the cuts of the blading is an important parameter in this type of studies. This variable indeed plays a role from an aerodynamic standpoint as well as from a mechanical standpoint. Searching for an optimum stacking law represents therefore a substantial amount of work in the designing of any HP compressor blading.

There is the problem of optimising the aerodynamic performance of each blading, defined in particular by the pumping margin and the output. It is also desired, during such an optimisation, to provide for or maintain the mechanical strength of each blade.

DISCLOSURE OF THE INVENTION

The invention first proposes a compressor blade, defined at each of the points of its surface by a sweep angle and a dihedral angle, comprising:
  a root,
  a tip, the distance between the root and the tip, measured along an axis referred to as the radial axis, perpendicular to an axis of rotation of the compressor, called the radial height (h),
  a zone, between the root and the tip, of which a first portion has a strictly positive leading edge dihedral angle, and a second portion has a strictly negative leading edge dihedral angle.
The maximum angle zone is, along said radial axis, between $r=0.25$ h or 0.3 h or 0.5 h and $r=0.65$ h or 0.7 h.

A form of a blade according to the invention, and in particular the choice of a maximum angle zone such as hereinabove, makes it possible to improve the operability of the compressor, without imposing a mechanical constraint and/or excessive consumption. The aerodynamic performance (pumping margin, output) can as such be optimised without degrading the mechanical strength of the blade.

The leading edge dihedral angle can be strictly negative at the tip, and strictly positive or strictly negative at the root.

If the zone located in the vicinity of the root of the blade has a strictly negative dihedral angle, the angle at the root is for example at most equal to $-10°$ or to $-15°$.

According to an embodiment, the first portion, with a strictly positive dihedral angle, forms an interval, or extends, at most, between the root of the blade and a position located at $r=0.85$ h along the radial axis, with the dihedral angle being for example negative at the tip.

The first portion, which has a strictly positive dihedral angle, can form an interval:
  extending, along the radial axis, at most between $r=0.1$ h and $r=0.85$ h, with the dihedral angle for example being negative at the root,
  and/or having a length, measured along said radial axis, at least equal to 0.4 h or between 0.1 h and 0.60 h.

Preferably, the difference between the dihedral angle measured at the root of the blade and the dihedral angle measured at the tip of the blade, is less than $10°$.

The blade such as hereinabove can:
  be mobile, with its root intended to be fixed to a circular disc of a rotor of said compressor, or with the blade being a part of an integrally-bladed disc,
  or be fixed, being a part of a fixed stator or of a variable timing stator.

The invention also relates to an engine, of the type used in aeronautics, comprising a compressor provided with fixed blades and mobile blades, with one or several blades being of the type described hereinabove.

DETAILED DESCRIPTION OF PREFERRED EMBODIMENTS

Figure 1:
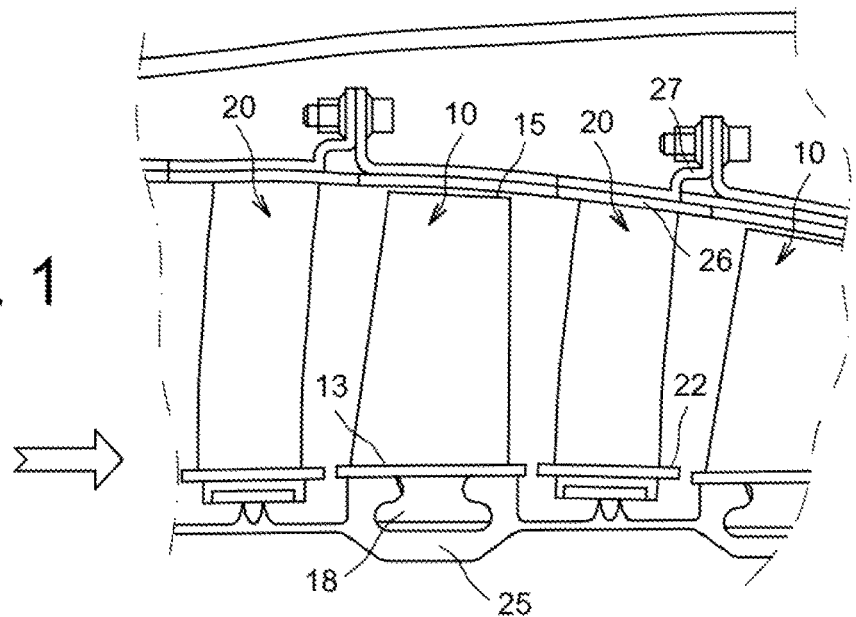
FIG. 1 is a diagram of a section of a compressor provided with its fixed and mobile blades.
Figure 2A:
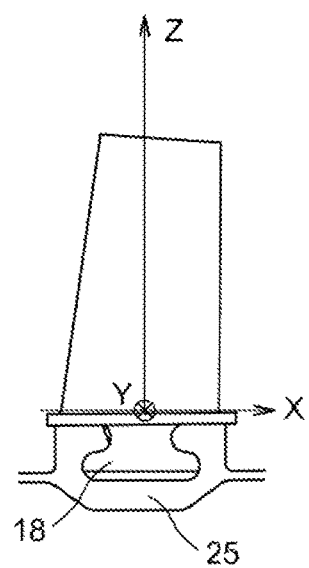
FIG. 2A is a diagram of a blade with a rectangular coordinate system (X, Y, Z) superimposed.

For each blade, a coordinate system XYZ is defined such as diagrammed in FIG. 2A: the axis X is the machine axis, oriented in a downstream direction, and it is parallel to the axis of rotation AA' (see FIG. 1).

The axis Z is perpendicular to X and defines the altitude z, from the root of the blade (z=0) to the top of the blade (z=h).

The axis Y is tangential, perpendicular to X and to Z.

Starting from there, another system, or local cylindrical system (X, R, u) is defined, linked to the blade considered, wherein:

X is still the machine axis, oriented downstream,

R is the radial axis, defined as Z, it is perpendicular to X and defines the altitude with respect to the root of the blade; it is also referred to as the stacking axis, u is the azimuthal axis oriented from the intrados of the blade towards the extrados of the adjacent blade for an engine of the SHAR type (clockwise direction facing rearward), or in the opposite direction for an engine of the SHAV type (clockwise direction facing frontward); it is perpendicular to X and to R. In the particular case of the vane shown in FIG. 2A, the Cartesian system (X, Y, Z) and the local cylindrical system (X, R, u) are identical.

The stacking of the cuts (recall that this is the position of the centre of gravity of each section of the blade according to a plane parallel to (X, u) and perpendicular to the main radial direction R of the blade, with respect to a main radial axis of the blade) can be defined in different ways:

by the position $x_G$, $y_G$ of the centre of gravity of the cuts along the axes x and y, or by the sweep and dihedral angles as described for example in the document of Leroy H. Smith and al. "Sweep and dihedral effects in axial-flow turbomachinery", September 1963, ASME.

This last definition is chosen here. The sweep and dihedral angles are therefore those defined in the document of Leroy H. Smith and al. mentioned hereinabove. The angles a, r, u defined in this article are the angles X, R, u defined hereinabove.

These angles measure the differences of the directions between the flow and the blades, as a projection respectively in a plane radial and axial and a plane axial and tangent to the direction of rotation of the machine.

If the flow is purely axial, which is approximately the case at the inlet of the machine, the sweep angle expresses the inclination of the blade in the axial direction, and the dihedral angle, the inclination of the blade in the tangential direction. A negative sign of the sweep angle expresses an inclination upstream, and a positive sign, downstream; and a negative sign of the dihedral angle expresses an inclination towards the intrados, and a positive sign, towards the extrados. The inclinations are defined using radial directions outwards.

A sweep angle and a dihedral angle are as such associated with each one of the points of the surface of the blade.

Figure 2B:
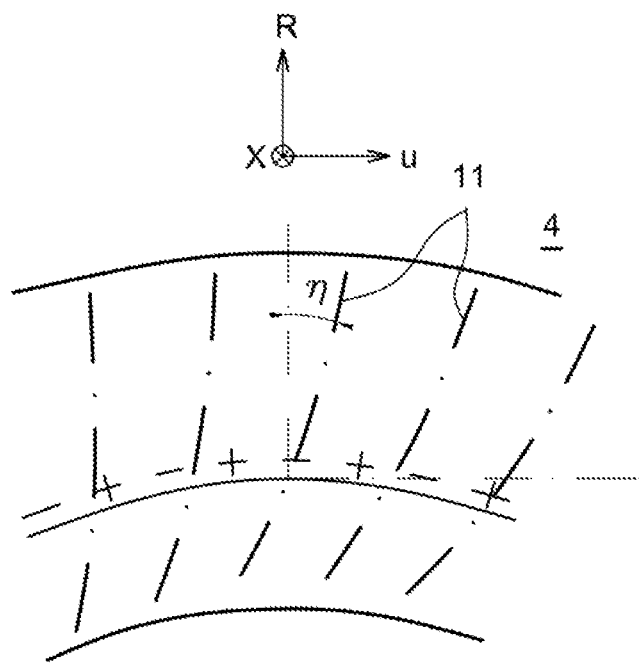
FIGS. 2B and 2C are cross-section diagrams of a blade with the indication of the various angles useful for understanding the invention superimposed.
Figure 2C:
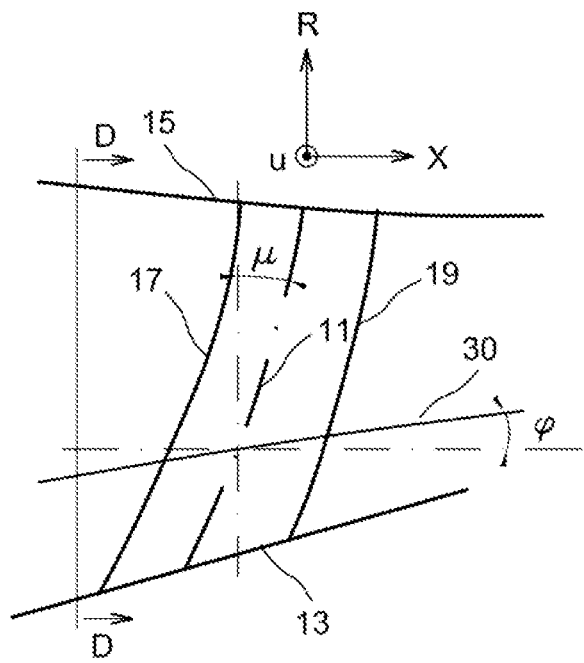
Figure 4:
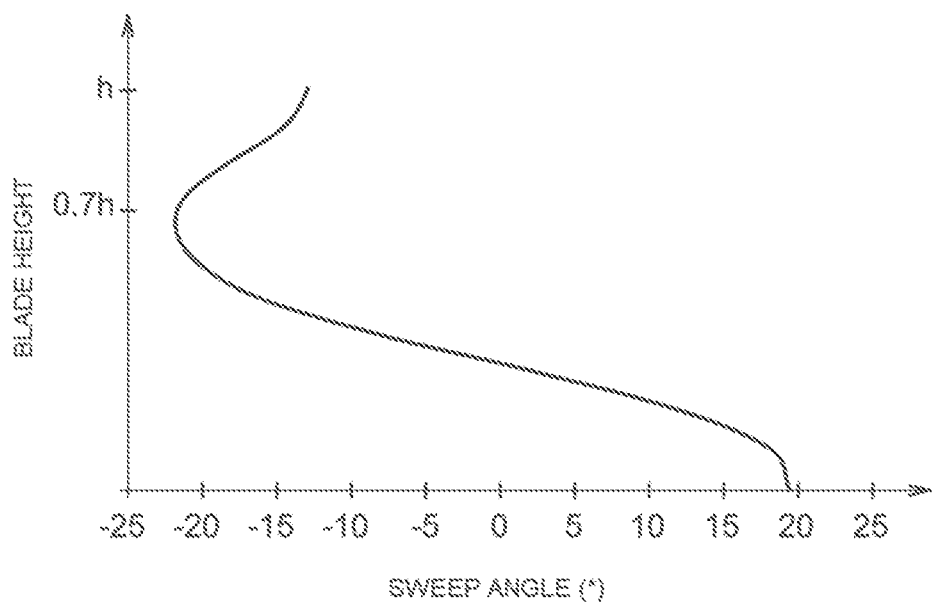
FIG. 4 shows the change of a sweep angle according to the height of the blade.

FIGS. 2B and 2C reproduce FIG. 4 from the article. They show cross-section views, respectively:

in the plane R, u (both perpendicular to the axis AA'), of a mobile blading (FIG. 2B), in the plane R, X (which contains the axis AA'), of a blade (FIG. 2C).

In these figures, the reference 11 has been added, which designated a possible curve study of the sweep and dihedral angles. In FIG. 2C, references 13 and 15 can be found which respectively designate the portion of the blade the closest to the root, and the tip of the blade. In this figure, the leading edge 17 and the trailing edge 19 of the blade shown can also be seen. The reference 30 designates a current line starting from which an axisymmetric flow surface (around the engine shaft) is generated.

Furthermore, in FIG. 2B, the angle η can be seen which forms, in the plane [R;u], at each one of its points, the curve 11 with the axis R. It can be considered that this is the angle that is, at each point on the curve 11, tangent to this curve 11 with the axis R. In other words, η is an angle made by the blade in a transverse and meridional section.

The angle μ (FIG. 2C) designates, at each point on the curve 11, the angle that forms the latter (or its tangent), in the plane [X;R], with the axis R. In other words, μ is an angle made by the blade in a transverse and meridional section. It can be considered here that the sweep and dihedral angles are those at the leading edge of the blade considered. In this case, the curve 11 follows the leading edge of the vane, and is therefore confounded with the leading edge 17. Finally, Vx, VR, Vu designate the projection, on the axes X, R, u, of the speed vector of the axisymmetric flow relative to the row of blades considered.

The following are also defined:
tan $\beta = V_u/V_x$
and:
tan $\varphi = V_R/V_x$ By following the notations hereinabove, and in accordance with the teaching of the article of L. H. Smith, the sweep angle λ is defined by:

$$\sin\lambda = \frac{\tan\varphi + \tan\mu + \tan\eta\tan\beta}{\sqrt{(1 + \tan^2\eta + \tan^2\mu)(1 + \tan^2\beta + \tan^2\varphi)}}$$

and the dihedral angle v is defined by:

$$\sin v = \frac{\sec\varphi\tan\eta - \tan\beta(\sin\varphi + \cos\varphi\tan\mu)}{\sqrt{(1 - \tan\varphi\tan\mu)^2 + (\tan\beta - \tan\varphi\tan\eta)^2 + (\tan\eta - \tan\beta\tan\mu)^2}}$$

Figure 3:
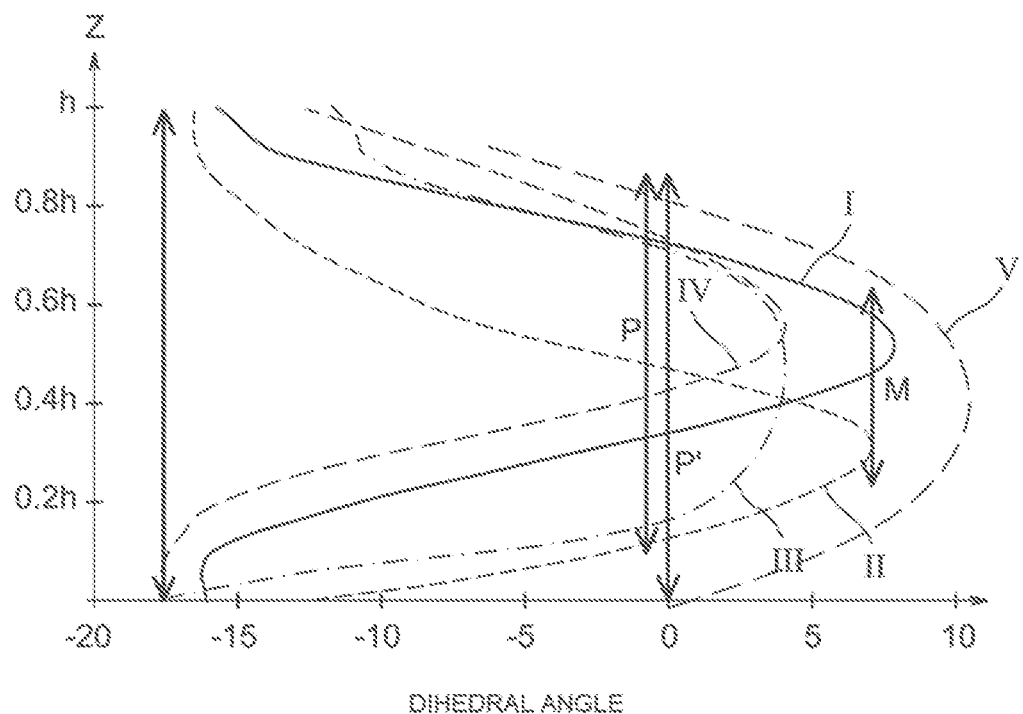
FIG. 3 shows various examples of the change of a dihedral angle of a blade according to the invention.

Embodiments of a blade according to the invention shall be described in liaison with FIG. 3.

This figure shows various curves that provide examples of change in the leading edge dihedral angle, such as defined hereinabove, according to the position along the axis R such as, it too, defined hereinabove.

It is seen, according to these figures, that the change in the dihedral angle defines a shape, referred to as "bulb", that comprises a portion for which the dihedral angle has strictly positive values and a portion (which can itself comprise two sub-portions) for which the dihedral angle has strictly negative values.

In FIG. 3, the following can be distinguished, along the y-axis (axis R):

a first portion, wherein the dihedral angle is strictly negative; for each one of the curves I-IV shown, this corresponds, on the axis R of the coordinates, to two zones, one close to the root of the blade, the other close to the tip of the blade, and a second portion, wherein the dihedral angle is strictly positive; for each one of the curves shown, this corresponds, on the axis R of the coordinates, to a single zone (or a single interval), located at a distance from the root of the blade and from the tip of blade.

More precisely, in the case of the examples that are shown in FIG. 3:

the curve I has a zone (or interval) with a strictly positive dihedral that extends, according to the axis R, between, approximately, 0.35 h and 0.72 h, the curve II has a zone (or interval) with a strictly positive dihedral that extends, according to the axis R, between, approximately, 0.15 h and 0.47 h, the curve III has a zone (or interval) with a strictly positive dihedral that extends, along the axis R, between, approximately, 0.17 h and 0.70 h, the curve IV has a zone (or interval) with a strictly positive dihedral that extends, according to the axis R, between, approximately, 0.43 h and 0.72 h.

In the zone or zones other than the zone with a strictly positive dihedral, the dihedral angle is strictly negative, and it is zero in only two points.

As is understood in the explanations hereinabove, the bulb shape extends here between a first position, referred to as low position, located in the vicinity or on the side of the root of the blade (dimension r=0 along the axis R), and a second position, referred to as high position, located in the vicinity, or on the side, of the tip of the blade (which has the dimension h along the axis R).

The low position is arranged between the root of the blade (position r=0 along the axis R) and a position, separated from the root, located at about r=0.25 h.

The high position is arranged between the tip of the blade (which corresponds to a position, separated from the root by a distance h) and a position, separated from the root by about 0.75 h. At the tip of the blade, the dihedral angle is strictly negative.

Preferably, the dihedral angle has a strictly positive value in an interval:

that extends, along R, over a length between 0.1 h and 0.6 h, but which, furthermore, is arranged or is strictly included inside a zone (identified by P in FIG. 3) of the blade for which r is between 0.1 h and 0.85 h. In other words, the zone (or the interval) with a strictly positive dihedral angle has, according to R, a lower point located at, at least r=0.1 h (it can be beyond this, for example at r=0.2 h or at r=0.3 h) and an upper point located at, at most, r=0.85 h (this upper point can be beyond 0.85 h, for example at r=0.5 h or r=0.7 h).

The two conditions hereinabove are satisfied for the four curves I-IV described hereinabove.

It is understood that a blade profile according to the invention can be with a negative dihedral angle at the root and at the tip, with, for example, a minimum angle, at the root (r=0) and/or at the tip (r=h), less than −10° or even −15°.

According to yet another example, the dihedral angle has a strictly positive value between 0.2 h and 0.8 h, therefore over an interval of length 0.6 h, which is indeed between 0.1 h and 0.85 h or which is strictly included within the interval 0.1 h-0.85 h. For the same length of interval (0.6 h), the latter could be between 0.1 h and 0.7 h (which is indeed, it too, between 0.1 h and 0.85 h).

According to another example, the zone or the interval with a strictly positive dihedral angle extends over a length of 0.4 h, with a lower point at 0.2 h and an upper point located at 0.6 h, satisfying the two conditions that have just been announced. For r<0.2 h or r>0.6 h, the dihedral angle is strictly negative.

With regards to the maximum angle, it can be between about 2.5° and 7° or 8°, or even 10°, or 15°, or 20°. The portion, or the zone, that has a maximum angle, is preferably included in the interval (identified by M in FIG. 3) wherein r varies, about, from r=0.25 h to r=0.65 h or r=0.7 h. In other words, this maximum is preferentially between r=0.25 h and r=0.65 h or 0.7 h.

As such, on the curve I, the maximum is at, approximately, 0.5 h while, for the curve II, it is at, approximately, 0.3 h.

And it can be seen that the angular difference between the dihedral angle at the root and the dihedral angle at the tip is less than about 10°. It is less than 2° for the curve I, about 5° to 8° for the curves II, III and IV.

Finally, the difference between the maximum dihedral angle (positive) and the minimum dihedral angle (negative) is, in the case of the four examples I-IV given, substantially between 20° and 23°. In general this difference is less than 20°.

An alternative is not shown wherein the dihedral angle:

is positive or slightly positive (for example it has a value between 0° and 5°) in the vicinity or on the side of the root of the blade (dimension r=0 along the axis R), then it increases towards a positive maximum, and it then decreases to reach zero, and finally, takes negative values until the tip of the blade.

FIG. 3 shows a curve V which provides, according to this alternative, an example of change of the dihedral angle (such as already defined hereinabove), for which is distinguished, along the axis R:

a first portion (comprising a single zone, or a single interval, starting from the root of the blade), wherein the dihedral angle is strictly positive; this portion is identified by P' in the FIG. 3, and a second portion (comprising a single zone, or a single interval, close to the tip of the blade), wherein the dihedral angle is strictly negative.

A blade profile according to the invention can therefore be with a positive dihedral angle at the root and negative at the tip, with, for example, a minimum angle, at the tip (r=h), less than −10° or even −15°.

For this curve V, the zone with a strictly positive dihedral extends, along the axis R, between 0 and, about, 0.72 h; outside of this zone, the dihedral angle is strictly negative, and it is zero in only one point. In low position, already defined hereinabove, the dihedral angle is strictly positive. In high position, also already defined hereinabove, the dihedral angle is strictly negative.

Preferably, according to this alternative, the dihedral angle has a strictly positive value on a zone that extends, along R, over a length of at least 0.4 h but which is arranged (and which can vary) between, at least, r=0 and, at most, r=0.85 h (in P' in FIG. 3).

With regards to the maximum angle, it can be between, about, 3° and 20°.

The zone that has a maximum angle is arranged preferentially between, about, r=0.25 h and r=0.7 h or, more preferably, between 0.5 h and 0.7 h or between 0.5 h and 0.65 h. This arrangement makes it possible to improve the pumping margin of the optimised stage without degrading the performance thereof. The maximum positioned between 0.25 h and 0.7 h makes it possible to reach dihedral angles less than −10° or even −15° without generating an excessive slope of the dihedral curve on the upper portion of the vane.

This makes it possible to not weaken the vane with regards to the inherent requirements concerning mechanical strength in the design of bladings. The maximum positioned between 0.5 h and 0.65 or between 0.5 h and 0.7 h represents in most cases the best compromise between the advantages mentioned hereinabove and the search for improving the output.

In any case, with regards to the sweep angle, the latter can follow a law of the type known according to prior art. Another possible example of a law is shown in FIG. 4, where it can be seen that the sweep angle has a value close to 20° at the root of the blade, decrease first slightly in a first zone along the axis z, then follows a substantially linear law, until reaching, for about r=0.7 h, an extreme between −20° and −25°. The sweep angle then decreases again, as the tip of the blade is approached.

Figure 5A:
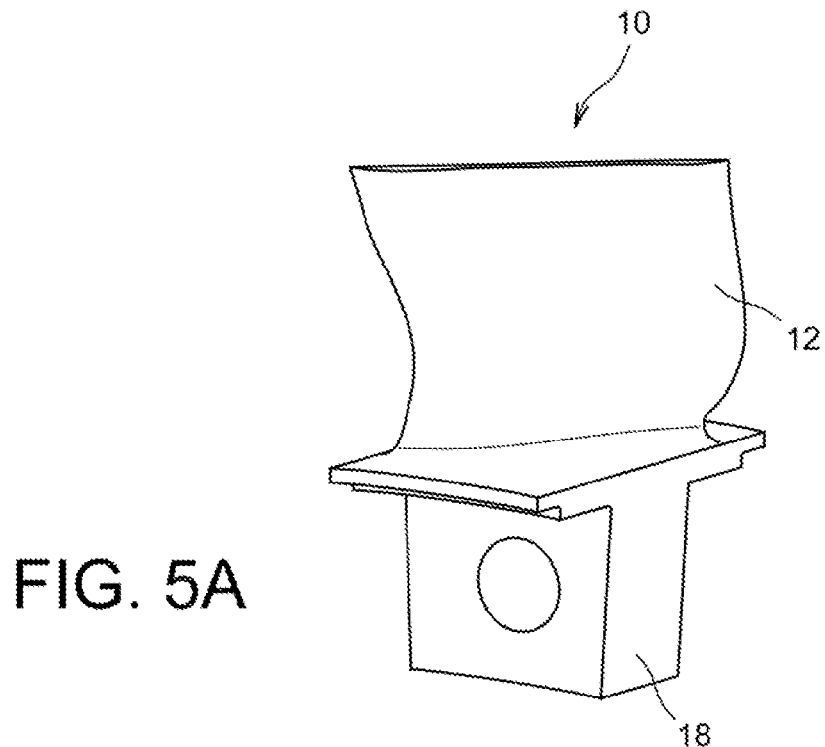
FIGS. 5A-5C show views of a blade produced in accordance with the invention.
Figure 5B:
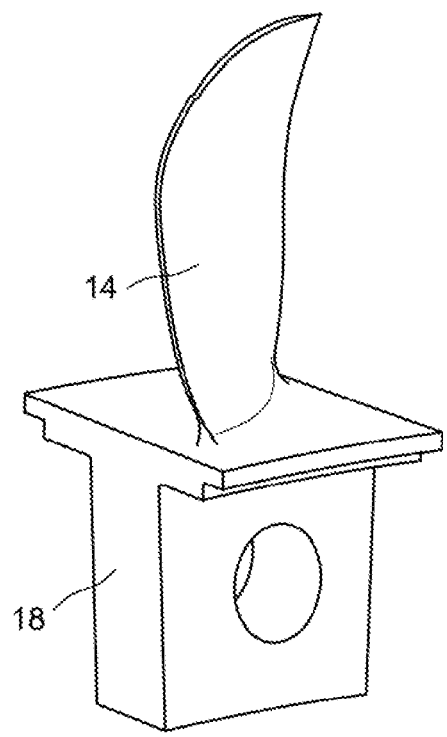
Figure 5C:
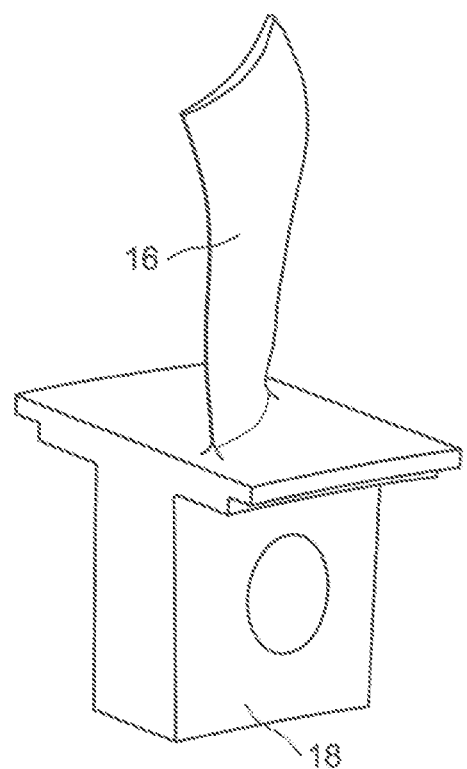

FIGS. 5A-5C show views of a blade produced in accordance with the invention:

- FIG. 5A shows a view thereof of the intrados 12 of the blade,
- FIG. 5B shows thereof of a view of the blade from its leading edge 14,
- FIG. 5C shows thereof of a view of the blade from its trailing edge 16.

In these figures, the blade is shown mounted on its root 18; the latter could have a shape adapted to the type of fastener implemented (for example a shape of a hammer, or Christmas tree, or dovetail type). But the invention also applied to a blade or to an integrally-bladed disc wherein there is no fastener; it also applies in the case of a rectifier, in which case there is also no fastener.

Figure 6:
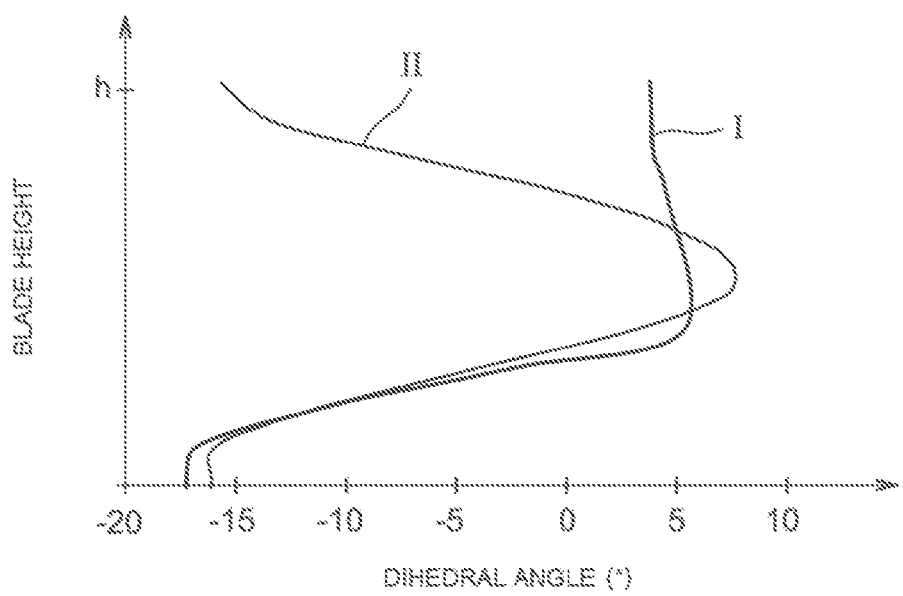
FIG. 6 shows a comparison between the change of a dihedral angle of a blade according to the invention and the change of a dihedral angle which does not implement the teaching of this invention.

FIG. 6 shows the difference between a law of change of the dihedral angle, which does not implement the teaching of this invention (curve I), and a law according to the invention (curve II).

With regards to the law of change according to the curve I, the law according to the invention, shown in this figure, improves the pumping margin of a stage of a high pressure compressor by a factor at least equal to 1.5. The output (for example the polytropic or isentropic output) is not substantially affected: it can even be considered that it is somewhat better (by about a few tenths of a percent; i.e. less than 0.8%) due to the root shape of the curve II.

The pumping margin of a stage can be approximately defined in the following way, using the flow rate D and Pi, which is the compression rate, or the total pressure at the blade output divided by the total pressure at the blade inlet.

In the plane Pi, D (FIG. 7) an isoregime curve is defined, which provides, for a given flow rate, the compression rate. An example of a change in this curve is provided in FIG. 7.

Figure 7:
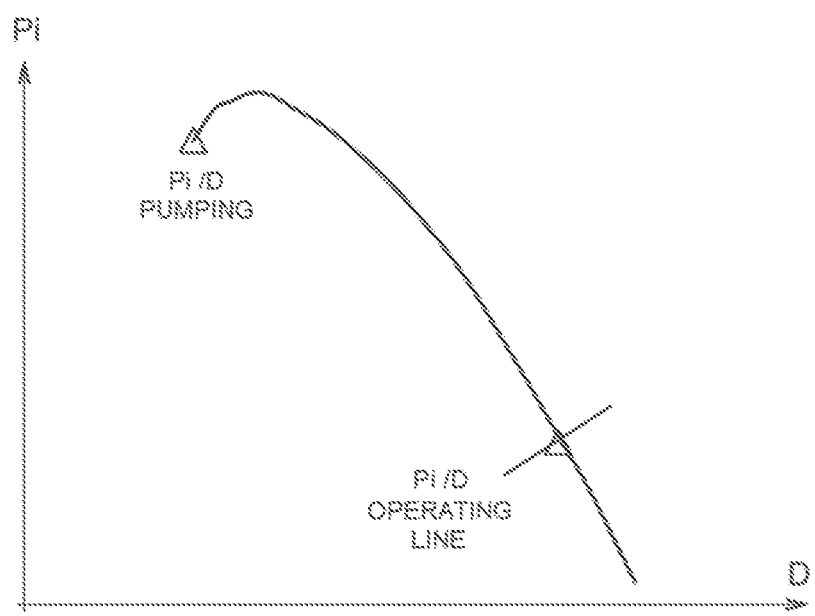
FIG. 7 shows an isoregime curve in the field Pi-D.

The pumping margin is defined, in turn, as the relationship between:

- the ratio Pi/D of the point that is the closest to the pumping (identified in FIG. 7 by Pi/D PUMPING"),
- and the ratio Pi/D at the point where the isoregime curve cuts the operating line (point identified in FIG. 7 by "Pi/D OPERATING LINE"). The operating line defines the set of stabilised operating points of the engine in the field Pi-Flow rate in nominal operation.

The description hereinabove was given for a vane or a mobile blade, in rotation about the shaft of the engine, during the operation of the latter, but it also applies to the form of a fixed blade that is part of a fixed stator or of a variable timing stator.

What is claimed is:

1. A compressor blade, defined at each point of its surface by a sweep angle and a dihedral angle, comprising:
    a root,
    a tip, a distance between the root and the tip, measured along a radial axis (R), perpendicular to an axis of rotation of the compressor, is referred to as a radial height (h),
    a zone, between the root and the tip, of which a first portion has a strictly positive leading edge dihedral angle, and a second portion has a strictly negative leading edge dihedral angle,
    the zone of maximum dihedral angle being, along said radial axis, between 0.25 of the radial height (h) to 0.7 of the radial height (h),
    wherein the dihedral angle is strictly negative, and less than −15°, at the tip of the blade, and wherein a difference between a maximum dihedral angle and a minimum dihedral angle is between 20° and 23°.

2. The compressor blade according to claim 1, with the leading edge dihedral angle being strictly negative at the root, and less than −10°.

3. The compressor blade according to claim 1, the first portion, with a strictly positive leading edge dihedral angle, forming an interval, or extending at most, between, on the one hand, the root of the blade (r=0), or a position located at 0.1 of the radial height (h), and, on the other hand, a position located at 0.85 of the radial height (h) along the radial axis.

4. The compressor blade according to claim 1, the first portion, which has a strictly positive leading edge dihedral angle, forming an interval that has a length, measured along said radial axis, at least equal to 0.4 of the radial height (h) and/or between 0.1 of the radial height (h) and 0.60 of the radial height (h).

5. The compressor blade according to claim 1, with the difference between the leading edge dihedral angle measured at the root of the blade and the leading edge dihedral angle measured at the tip of the blade, being less than 10°.

6. The compressor blade according to claim 1, wherein:
    said blade is at least one of mobile and fixed;
    wherein when said blade is mobile, the root is fixed to a circular disc of a rotor of said compressor, or said blade is a part of an integrally-bladed disc,
    wherein when said blade is fixed, said blade is a part of a fixed stator or of a variable timing stator.

7. An aircraft engine comprising a compressor provided with fixed blades and mobile blades, with a portion at least of the blades being according to claim 1.

* * * * *